US008347473B2

(12) United States Patent
Hux

(10) Patent No.: US 8,347,473 B2
(45) Date of Patent: Jan. 8, 2013

(54) STUD INSTALLATION TOOL AND METHOD OF USE

(76) Inventor: Alton Wayne Hux, Eureka, MO (US)

( * ) Notice: Subject to any disclaimer, the term of this patent is extended or adjusted under 35 U.S.C. 154(b) by 287 days.

(21) Appl. No.: 12/889,449

(22) Filed: Sep. 24, 2010

(65) Prior Publication Data

US 2012/0073111 A1 Mar. 29, 2012

(51) Int. Cl.
*B23P 19/04* (2006.01)

(52) U.S. Cl. ................ 29/257; 29/256; 29/266; 24/455; 148/563

(58) Field of Classification Search .................... 29/256, 29/257, 266, 456; 24/455; 148/563
See application file for complete search history.

(56) References Cited

U.S. PATENT DOCUMENTS

2005/0071973 A1 * 4/2005 Emanuel ........................ 29/257
2007/0044697 A1 * 3/2007 Shomura et al. .............. 112/236
2007/0157444 A1 * 7/2007 Lawrence et al. ............... 29/264
2009/0300896 A1 * 12/2009 Ozzimo .......................... 29/267

* cited by examiner

*Primary Examiner* — Derris H Banks
*Assistant Examiner* — Anthony Green
(74) *Attorney, Agent, or Firm* — Jerry D. Haynes; Law Office of Jerry D. Haynes, P.A.

(57) ABSTRACT

A stud installation tool comprising a slide shaft including a pair of arms angled towards each other, a slide bar with a triangular head at an end engaged within the pair of arms to enable the slide bar to move along the slide shaft without disengaging, a receiving brace attached to the slide shaft at an opposing end from the slide bar, where said receiving brace includes a threaded hole, a bolt threaded through the slide bar and extending down and through the threaded hole, a bolt head fastened to the bolt and positioned above the slide bar, and a stud holder connected to the slide bar at an end opposite from the triangular head wherein the stud holder includes an opening to accept a stud after the stud is slid through a hole in an axle plate and positioned between the receiving brace and the stud holder.

6 Claims, 1 Drawing Sheet

STUD INSTALLATION TOOL AND METHOD OF USE

BACKGROUND OF THE INVENTION

1. Field of the Invention

The present invention relates to a tool to aid a mechanic when installing a stud in an axle.

2. Description of Related Art

Mechanics and car enthusiasts both understand the detailed workings and complexities of working on a vehicle. Some mechanics may specialize in foreign cars, while others prefer classic or restored vehicles. A common trait is that they are continuously looking for tools or devices which will make their work easier or faster. Whether it be using an air gun to screw a bolt or utilizing a lift to get under the engine, anything to make the work more efficient or less cumbersome is preferred.

A common problem in auto mechanics relates to the installation of studs into an axle. The task can be a painstaking job for any mechanic. Some home repair enthusiasts may utilize the "smack it with a hammer" technique. Not only is this method dangerous, potentially severely hurting the person, but it is detrimental if the surrounding axle components are broken. Other mechanics may use large industrial tools or machines only found in professional garages or repair shops. These methods may be cumbersome, dangerous, and time consuming due to the positioning and angle accessibility of the unit components. While there are available methods of stud installation, there is not a method or tool which performs the task without undue burdens or excessive manual labor.

It would be desirable in the art to provide a hand tool which allows a mechanic to easily install a stud into an axle. It would also be beneficial to provide a tool which is not only used by professional mechanics but also at home enthusiasts.

SUMMARY OF THE INVENTION

An object of the present invention is to provide a stud installation tool comprising a slide shaft including a pair of arms angled towards each other, a slide bar with a triangular head at an end engaged within the pair of arms to enable the slide bar to move along the slide shaft without disengaging, a receiving brace attached to the slide shaft at an opposing end from the slide bar, where said receiving brace includes a threaded hole, a bolt threaded through the slide bar and extending down and through the threaded hole, a bolt head fastened to the bolt and positioned above the slide bar, and a stud holder connected to the slide bar at an end opposite from the triangular head wherein the stud holder includes an opening to accept a stud after the stud is slid through a hole in an axle plate and positioned between the receiving brace and the stud holder.

Another object of the present invention is to provide a hand tool which enables both professional and home mechanics to safely and efficiently install a stud within an axle.

These together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DRAWINGS

The present invention relates to a stud installation tool for installing a stud into an axle without requiring the time consuming, dangerous tools commonly found in professional garages. The stud installation tool places the studs in a quick and safe manner, with relative ease and efficiency. The stud installation tool conveniently allows individuals to install semi-permanently mounted wheel studs that are directly positioned to the vehicle axle plate or disk hub. The design of the stud installation tool is compact and easy to transport and features components that are specifically made of case hardened steel for greater quality and durability.

Figure 1:
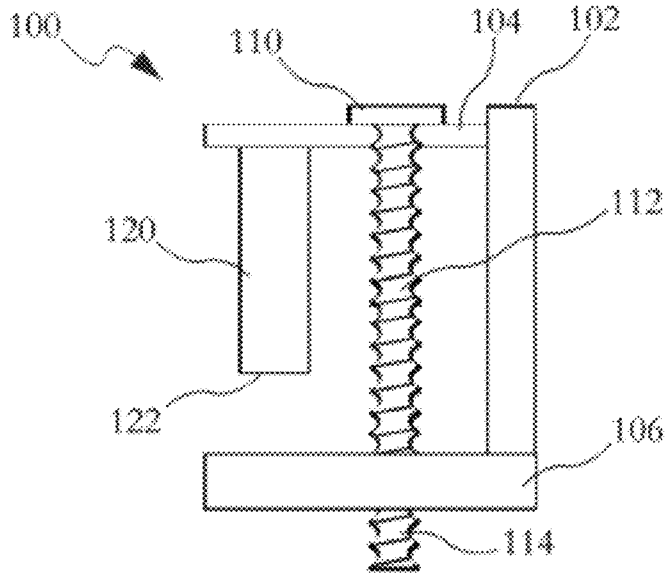
FIG. 1 depicts a perspective view of a stud installation tool in accordance with an exemplary embodiment of the present invention.

Turning now descriptively to the drawings, FIG. 1 shows a perspective view of a stud installation tool (100) in accordance with an exemplary embodiment of the present invention. The stud installation tool (100) includes a slide shaft (102), a slide bar (104), a receiving brace (106), a bolt (112) and a stud holder (120). The slide bar (104) extends perpendicularly from the slide shaft (102), and slides up and down along the slide shaft (102). At a bottom portion of the slide shaft (102), the receiving brace (106) connects to the slide shaft (102) to serve as a securing means and a handle for the stud installation tool (100). The receiving brace (106) is positioned parallel to the slide bar (104). A user may place their hand on the receiving brace (106) to secure the stud installation tool (100) against a stud (142) on an axle (140). The receiving brace (106) includes a hole with a threaded opening to receive the bolt (112).

The bolt (112) fits through the slide bar (104), positioned between the slide shaft (102) and the stud holder (120). The bolt (112) includes a bolt head (110) situated above the slide bar (104) and at a bottom end (114) fitted through the threaded opening in the receiving brace (114). The stud holder (120) is securely attached to the slide bar (104) at one end and has an opening at another end. The stud holder (120) may be hollow along the entire body to accept the stud (142) into the opening (122). The entire stud installation tool (100) may be made from case hardened steel or another hard metal able to withstand high pressure forces without deforming.

Figure 1A:
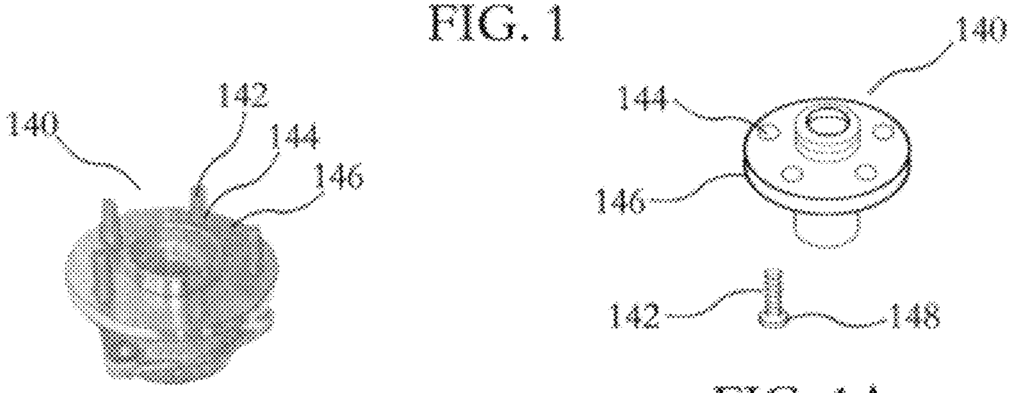
FIG. 1A depicts an axle with studs shown installed and with stud prior to installation.

Referring to FIG. 1(A), an axle (140) is shown with the stud (142) outside a hole (144) in an axle plate (146). FIG. 1(A) illustrates the stud (142) before the stud installation tool (100) is used to push the stud (142) into the axle plate (146), disk hub or brake drum. A head (148) of the stud (142) ensures that the stud (142) does not pass through the axle plate (146). The stud installation tool (100) pushes the stud (142), positioned in the stud holder (120), further into the hole (144) to snap securely into the axle plate (146).

Figure 2:
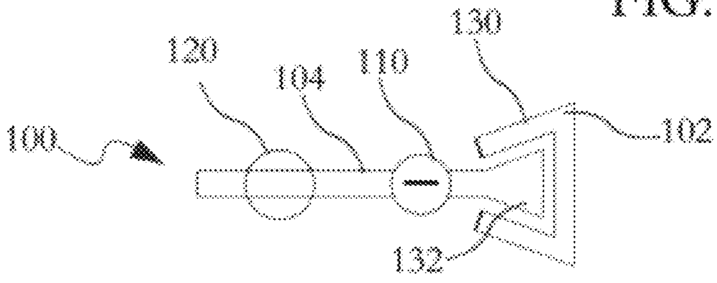
FIG. 2 depicts a top view of a stud installation tool in accordance with an exemplary embodiment of the present invention.

FIG. 2 shows a top view of the stud installation tool (100) in accordance with an exemplary embodiment of the present invention. The top view shows a clear view of the configuration of the slide bar (104) within the slide shaft (102). The bolt head (110) and the stud holder (120) are illustrated in relation to their positions along the slide bar (104). The slide shaft (102) may have a set of angled arms (130) (hereinafter angled arms) extending inwardly towards each other and stopping just before meeting the slide bar (104). The portion of the slide bar (104) within the slide shaft (102) includes a triangular head (132) to prevent the slide bar (104) from dislocating from the angled arms (130). The triangular head (132) and angled arms (130) enable the slide bar (104) to remain engaged within the slide shaft (102) while using the stud installation tool (100).

To operate the stud installation tool (100), first a user slides the stud (142) into the hole (144) of the axle plate (146), then the stud (142) is placed within the stud holder (120) and the receiving brace (106) abuts one side of the axle plate (146). One end of the receiving brace (106) may rest against the axle plate (146) and another end, the portion where the receiving brace (106) meets the slide shaft (102), may be held by the user. Next, an air gun may be aligned against the bolt head (110) to turn the bolt (112) within the slide bar (104) and the receiving brace (106). While the air gun turns the bolt (112), the slide bar (104) moves down the slide shaft (102) towards the receiving brace (106). As the slide bar (104) moves, the receiving brace (106) pushes against the head (148). The air gun tightens the bolt (112), in turn causing receiving brace (106) to press firmly against the stud (142), so that eventually the stud (142) pops into the axle plate (146) with ease. The user may safely and conveniently install the stud (142) into the axle (140) without using the time consuming and dangerous machines conventionally used for stud installation. Even a home user or mechanic may utilize the stud installation tool (100) with ease and efficiency.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A stud installation tool comprising:

a slide shaft, where said slide shaft includes a pair of arms angled towards each other;

a slide bar, where said slide bar has a triangular head at an end engaged within said pair of arms to enable said slide bar to move along said slide shaft without disengaging;

a receiving brace attached to said slide shaft at an opposing end from said slide bar, positioned parallel to said slide bar, where said receiving brace includes a threaded hole;

a bolt threaded through said slide bar and extending down and through said threaded hole;

a bolt head fastened to said bolt, where said bolt head is positioned above said slide bar next to said slide shaft; and a stud holder connected to said slide bar at an end opposite from said triangular head wherein said stud holder includes an opening to accept a stud after said stud is slid through a hole in an axle plate and positioned between said receiving brace and said stud holder.

2. The stud installation tool of claim 1, wherein said bolt head enables an air gun to turn said bolt.

3. The stud installation tool of claim 1, wherein said stud installation tool is made from case hardened steel.

4. The stud installation tool of claim 1, wherein said receiving brace serves as a handle for a user.

5. A method of installing a stud comprising the steps of:

placing a stud through a hole in an axle plate;

positioning said stud and said axle plate between a stud holder and a receiving brace;

twisting a bolt connected to a slide bar, attached above said stud holder, and said receiving brace until said stud passes into an opening in said stud holder;

activating an air gun secured against a bolt head to turn said bolt;

screwing said bolt to lowers said slide bar towards said receiving brace; and tightening said receiving brace against a head of said stud until said stud snaps snugly into said axle plate.

6. The method of installing a stud of claim 5, further comprising the step of bracing said receiving brace with a hand of a user.

* * * * *